(12) United States Patent
Hart et al.

(10) Patent No.: US 8,947,349 B1
(45) Date of Patent: Feb. 3, 2015

(54) PROJECTING CONTENT ONTO A DISPLAY MEDIUM

(75) Inventors: Gregory M. Hart, Mercer Island, WA (US); Ian W. Freed, Seattle, WA (US); Jeffrey P. Bezos, Greater Seattle, WA (US)

(73) Assignee: Rawles LLC, Wilmington, DE (US)

( * ) Notice: Subject to any disclaimer, the term of this patent is extended or adjusted under 35 U.S.C. 154(b) by 869 days.

(21) Appl. No.: 12/716,112

(22) Filed: Mar. 2, 2010

(51) Int. Cl.
*G09G 5/00* (2006.01)

(52) U.S. Cl.
USPC .......................................... 345/156; 348/744

(58) Field of Classification Search
USPC .......................................... 345/156–158, 173
See application file for complete search history.

(56) References Cited

U.S. PATENT DOCUMENTS 7,069,516 B2 * 6/2006 Rekimoto ..................... 715/757
7,348,963 B2 * 3/2008 Bell ............................... 345/156

OTHER PUBLICATIONS

"Pattie Maes and Pranav Mistry demo SixthSense", Retrieved on Feb. 10, 2010 at <<http://www.ted.com/talks/lang/eng/pattie_maes_demos_the_sixth_sense.html>> www.TED.com, 9 pgs.
Pinhanez, "The Everywhere Displays Projector: A Device to Create Ubiquitous Graphical Interfaces", IBM Thomas Watson Research Center, Ubicomp 2001, 18 pages.

\* cited by examiner

*Primary Examiner* — Alexander Eisen
*Assistant Examiner* — Kenneth B Lee, Jr.
(74) *Attorney, Agent, or Firm* — Lee & Hayes, PLLC

(57) ABSTRACT

Described herein are systems and techniques for detecting a location of a medium and projecting content onto the medium at the detected location. These systems and techniques also track the changing location of the medium while continuing to project the content onto the medium as the location changes. A user consuming the content on the medium is able to move the display medium relative to a projection device that projects the content without interrupting the consumption of the content.

42 Claims, 12 Drawing Sheets

PROJECTING CONTENT ONTO A DISPLAY MEDIUM

BACKGROUND

A large and growing population of people is enjoying entertainment through consumption of digital content items, such as music, movies, images, books and so on. Many people today consume digital content through a wide variety of electronic devices. Among these electronic devices are cellular telephones, personal digital assistants (PDAs), electronic book readers, portable media players, tablets, netbooks and the like.

As more content is made available in digital form, people continue to consume more and more of this content. In addition, this population expects this digital content to become more and more accessible and ubiquitous. Although content has become easier to obtain, a number of issues remain. For example, people may have difficulty determining and locating the appropriate device to use for a particular action. In addition, once the device is identified, the device still needs to be operable and properly configured to perform the desired task.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 also illustrates handing off the projection of the digital content from one projection system to another as the user moves about within the illustrated environment.

DETAILED DESCRIPTION

Figure 1:
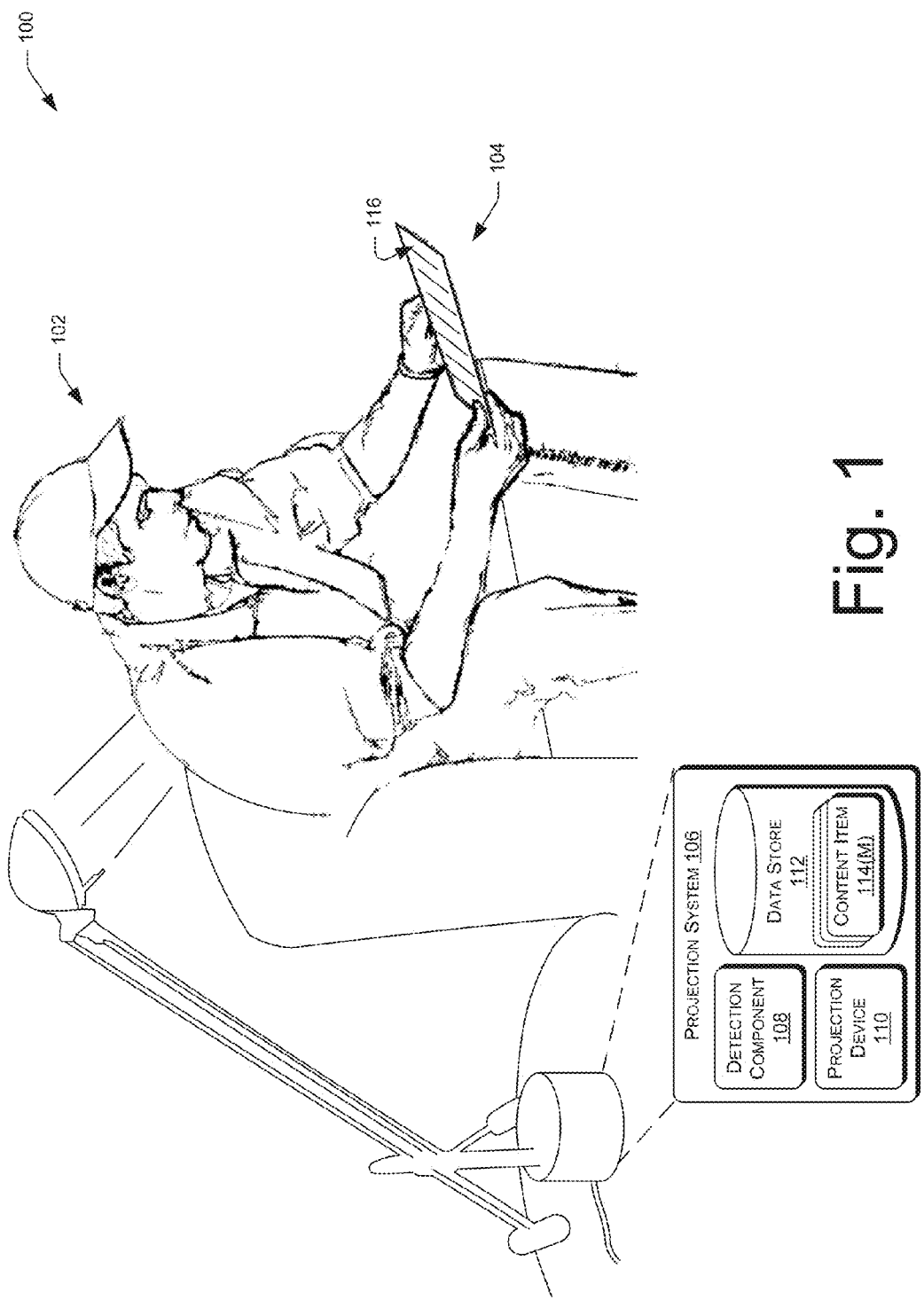
FIG. 1 illustrates an environment where a projection system detects a location of a non-powered medium before projecting digital content onto the non-powered medium at the detected location for consumption by a user.

This disclosure describes systems and techniques for detecting a location of a display medium and projecting digital content onto the display medium. These systems and techniques also dynamically track the changing location of the display medium while continuing to project the content onto the medium as the location changes. Therefore, a user who consumes the digital content on the medium is able to move the display medium relative to a projection device that projects the content without interrupting the consumption of the content. For instance, the user is able to read an electronic book, watch a video, view an image or otherwise consume any other form of projected content while moving about relative to the projection device. In some implementations, the display medium is a non-powered medium such that the user is able to consume content without the need to recharge or otherwise provide power to the medium itself.

A display medium may include a dedicated presentation element (e.g., made of a white plastic or another light reflective material), a surface of the user (e.g., a hand of the user) or a surface of an environment surrounding the user (e.g., a wall or table).

In some instances, the projection system turns on in response to detecting the medium. When, for example, a display medium comprises a presentation element having one or more infrared identification elements or markers, the projection system may turn on in response to detecting the infrared marker(s) after a user turns over the sheet such that the sheet faces the projection system. Conversely, the system may shut down when the user again turns over the sheet and hides the infrared markers. Furthermore, the projection system may detect the presence of the medium in any number of ways as discussed in detail below, including via motion sensing, hardware tokens (e.g., RFID tags), facial recognition, voice recognition and the like. The projection system can also identify the user. For example, the projection system can identify the user utilizing facial recognition, voice recognition or recognition of clothing or jewelry that is unique to a user.

While the display medium may be non-powered, the projection device may receive power from a non-discharging power supply (e.g., a standard wall outlet or wireless power source) in some instances. When in use and coupled to the non-discharging power supply, the projection device may remain in a stationary location. As such, a user is able to consume the projected content for an indefinite amount of time and without the need to recharge any components within the projection system.

Some implementations may include multiple projection devices that function together to form an interconnected projection network. Here, each projection device is able to project content within a predefined distance or zone from the device. In these instances, when the user moves from zone to zone (e.g., within a house of the user), the projection devices continually track the location of the display medium and handoff projection of the digital content based on these tracked locations. For instance, when a user holding a display medium moves from a zone covered by a first projection device to a zone covered by a second projection device, the first projection device transparently hands off the projection to the second device without interrupting the projection. In some instances discussed below, both the first and second projection devices project the content during the handoff before transitioning substantially or entirely to the second device.

The digital content being projected onto the display medium may be stored locally or remotely. In the latter instances, the projection system may include a network interface (e.g., wired, wireless) that retrieves content in response to receiving a request for the content. For instance, when the projection system detects a location of a display medium, the projection system may also determine content associated with that particular display medium or with a user associated with that particular display medium. The projection system may then retrieve and make available such content, such as electronic books, images, videos or the like previously obtained by and stored in a user account of the user associated with that particular display medium. Similarly, preferences may be set such that the projection system may display specific types of content depending on the location of the display medium. For example, the display system may be configured to display (or initially display) a newspaper when the display medium is in the kitchen, email when the display medium is in the office or a television remote control when the display medium is near the family room couch.

In addition to enabling users to consume digital content on a non-powered medium while moving about, these system and techniques also function to maintain the quality of the user experience traditionally found while consuming content via portable electronic devices. To do so, the projection system includes a closed-loop feedback system for dynamically adjusting the tilt, focus and brightness of the projection onto the display medium.

For instance, the projection system may determine (e.g., continually or periodically) a distance between the projection device and the non-powered medium as well as an orientation of the non-powered medium relative to the projection device. In response, the projection system may adjust the lens and/or mirror of the projection device to maintain a focus and/or field of view of the projected content. Additionally or alternatively, the system may determine an amount of ambient light in the environment surrounding the display medium or an amount of ambient light present on the display medium itself. In response, the system may adjust dynamically a brightness of a light source of the projection device to maintain a brightness of the projected content from the perspective of the user.

In some implementations, the system may determine an amount of ambient light at multiple locations on the display medium (e.g., via infrared markers located at each corner of the medium) and may adjust the brightness of different portions of the light source to account for these differing amounts of ambient light at these locations. As a result, the digital content is projected such that the user views content having both a consistent and uniform brightness.

In some implementations described below, a projection system may be integral with a device having functionality in addition to projection functionality. For instance, the projection system may be integral with a table-top or bedside lamp, with lighting fixtures affixed to a ceiling, with mounted television sets or with any other type of device. Therefore, when the projection portion of the device is not in use, the additional functionally may be employed. In the example where the projection system is integral with a lamp, for instance, a user may use the lamp when not projecting content using the described projection system. In still other instances, the device may be used both for projecting content as well as for the additional functionality (e.g., as a traditional bedside lamp). Similarly, when the projection system is not being used to display content on a portable display medium, the projection system may be used to project artistic content, news or other information on the surfaces (e.g. walls, floors) of the surrounding environment. In some instances this content may be customized based on, for example, preferences of the user(s) that are detected to be proximate to the projection system. For example, the projection system may project the user's favorite artwork or personalized news tickers.

The following discussion describes one of many environments that may implement the systems and techniques described herein. The specification then describes example components that collectively function to implement the techniques described herein, an example of how the projection system may locate a medium as well as handoff a projection of content and ways in which multiple users may interact with the projection systems described herein. The discussion then includes an illustrative projection system.

This brief introduction and corresponding summaries are provided for the reader's convenience and are not intended to limit the scope of the claims.

FIG. 1 illustrates an illustrative environment 100 in which a user 102 consumes content that is projected onto a non-powered medium 104 by a projection system 106. The projected content may include any sort of multimedia content, such as text, color images or videos or any other visual content. In this example, the user 102 simply picks up the non-powered medium 104 and, in response, the projection system 106 recognizes and detects the location of the medium 104. The projection system 106 also begins projecting the content onto the medium 104. The user 102 is then able to consume the projected content as well as navigate to other content, just as the user 102 would be able to do using a traditional portable electronic device.

In this example, the projection system 106 also tracks the location of the medium 104 within a predetermined distance of the system 106 and continues to project the content onto the medium 104 while within this distance. As such, the user 102 is able to move about within the room and continue to consume the projected content. In addition, because the projection system 106 plugs into a standard wall outlet in this example, the user 102 may consume the projected content without interruption for an indefinite amount of time and without the need to recharge any component of the system.

The projection system 106 of FIG. 1 includes a detection component 108, a projection device 110 and a data store 112 storing one or more content items 114(1), 114(2), . . . , 114(M). The detection component 108, which may comprise a camera, functions to detect a presence and a location of the display medium, depicted here as non-powered medium 104. The detection component 108 then passes this information onto the projection device 110, which may comprise a microlaser projector, a digital light projector (DLP), cathode ray tube (CRT) projector, liquid crystal display (LCD) projector, light emitting diode (LED) projector or the like. In response, the projection device 110 then projects content associated with one or more of the content items 114(1)-(M) onto the medium 104 at the detected location. Furthermore, the detection component 108 continues to track the location of the medium 104 and pass this information along to the projection device 110. By doing so, the projection device 110 is able to project the content onto the medium 104 even as the location of the medium changes.

The detection component 108 may detect the presence and location of the non-powered medium 104 in any number of ways. For instance, a top side 116 of the non-powered medium 104 may comprise a white sheet that includes one or more infrared markers that are identifiable by the detection component 108. As such, when the top side 116 of the non-powered medium 104 faces or can otherwise be seen by the detection component 108, the detection component 108 detects the infrared markers and begins projecting content onto the medium 104.

In other implementations, the non-powered medium 104 includes a unique hardware token, such as an RFID tag. Here, the detection component 108 may include a tag reader that attempts to detect the presence and potentially the location of the medium 104 when the hardware token is within the predetermined distance of the projection system 106. As such, the projection device 110 may begin projecting the content in response to the medium entering this predetermined area and the detection component recognizing the token. Furthermore, the medium 104 detected via the RFID tag may be associated with a particular user and, as such, the projection device 110 may project or otherwise make available content previously obtained by or otherwise associated with the user.

In still other implementations, the detection component 108 detects the presence and/or location of the non-powered medium 104 by detecting a presence of a user associated with the medium. Here, the detection component 108 may include motion sensors, facial recognition technology and/or voice recognition technology to detect the presence and identity of a user. In response to detecting the identity of a particular user, the projection system 106 begins projecting the content automatically or at the request of the user 102 (e.g., via voice commands, gestures).

The content items 114(1)-(M) stored by the data store 112 and projected onto the non-powered medium 104 may comprise any one or a combination of text, image, video and the like. In some instances, the content items 114(1)-(M) include electronic books ("eBooks"). The terms "book" and/or "eBook," as used herein, include electronic or digital representations of printed works as well as digital content that may include text, multimedia, hypertext and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, etc. Accordingly, the terms book and/or eBook may include any content that is in electronic or digital form.

Figure 2:
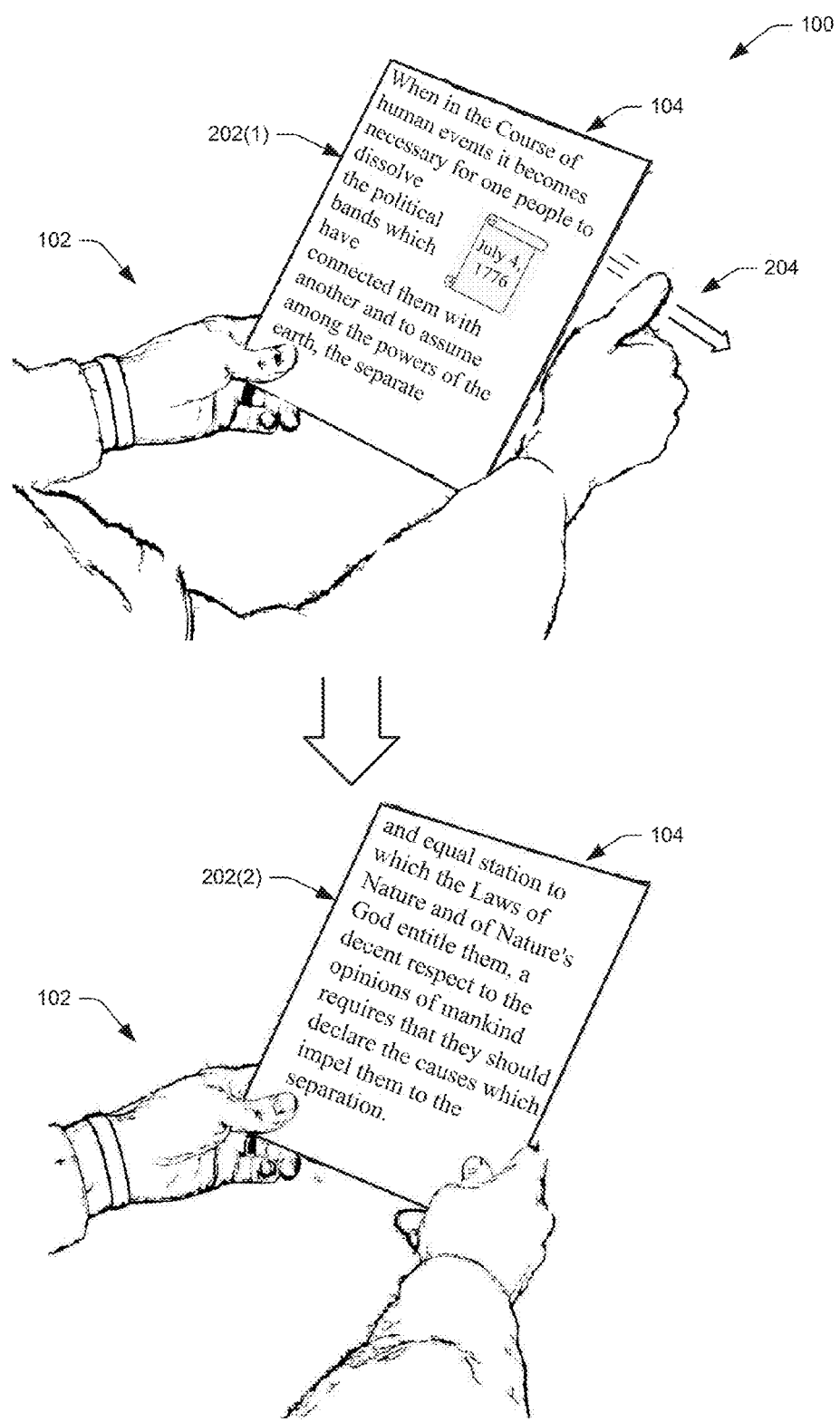
FIG. 2 illustrates the user of FIG. 1 navigating the digital content being projected onto the non-powered medium.

FIG. 2 illustrates the user 102 navigating the content being projected onto the medium 104 by the projection device 110. FIG. 2 illustrates that the projection device 110 first projects a portion of an eBook 202(1) before detecting a gesture 204 of the user 102. Here, the gesture 204 comprises the user 102 sweeping his thumb to the right of the non-powered medium 104. Upon detection of this gesture 204, a request is sent to the projection system 106 to navigate to a proceeding portion of the eBook 202(2) as illustrated in the bottom portion of FIG. 2. Other gestures may include the user holding the medium in one hand and moving the other hand in a defined or selected manner to perform a function. For example, the user can gesture with the hand not holding the medium in a defined manner to zoom in on the content (e.g., flat, palm up toward face defined as zoom in). Similarly, the user can define that hand palm down and away from face as zoom out. Panning can also be performed by turning the hand palm down and moving up, down, left and right.

While FIG. 2 illustrates the user 102 requesting to navigate to a proceeding section of the illustrated eBook, the user 102 may similarly request to navigate the projected content in any other manner. For instance, the user 102 may request to navigate to a previous portion of the eBook, to increase a font size of the eBook, to view a different content item or to interact with the projection system 106 in any other way. Furthermore, while FIG. 2 illustrates an example gesture, the projection system 106 many interpret other similar or different gestures as discussed in detail below.

Furthermore, the projection system 106 may be configured to allow the user 102 to interact with the projected content and the system in manners other than gestures. For instance, the projection system may include an audio component (e.g., a microphone) that allows the user to aurally speak commands to interact with the projected content or otherwise make requests to the projection system 106. For instance, the projection system 106 may allow the user to proceed to the second portion of the eBook by, for example, aurally stating "next page." The user 102 may make other similar or different commands, such as "close book," "launch browser," "launch email client" and the like.

Figure 3:
FIG. 3 illustrates the user of FIGS. 1 and 2 requesting to cease the projection of the digital content by, for example, turning over the non-powered medium.

FIG. 3 illustrates the environment 100 after the user 102 has chosen to shut down the projection device 110. In this example, the user 102 has turned over the non-powered medium 104 such that the top side 116 of the medium 104 no longer faces or can be seen by the projection system 106. Instead, a bottom side 302 that does not include the infrared markers now faces the projection system and, as such, the projection system 106 has ceased projection of the content.

While FIG. 3 illustrates that the user 102 effectively halts projection of the content by turning over the non-powered medium 104, the user 102 may do so using other methods in different implementations. For instance, the user 102 may request to cease the projection by interacting with the content displayed on the medium 104 by using a voice command or a gesture received and interpreted by the projection system 106 or in any other manner.

Figure 4:
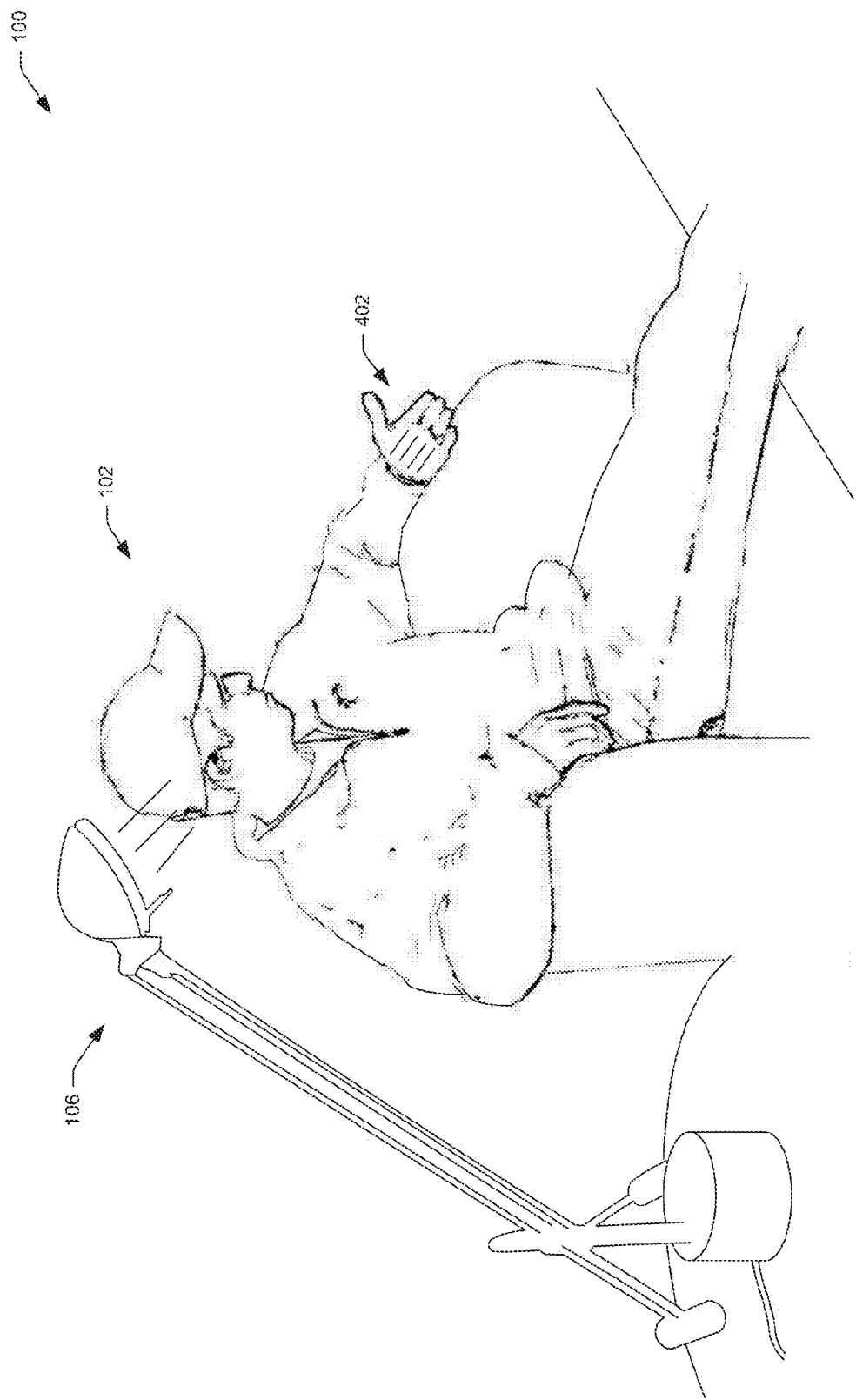
FIG. 4 illustrates the environment of FIG. 1 where the projection system detects a location of a non-powered medium before projecting digital content onto the non-powered medium at the detected location. Here, the medium is a surface of the user.

FIG. 4 illustrates the environment 100 when the projection system 106 uses a surface 402 of the user 102 as a display medium on which to project content. Here, the surface 402 is the hand of the user 102. As above, this content may include text, images, video and/or any other digital or non-digital content capable of being visually rendered. Similar to the discussion above with regard to FIG. 2, the user 102 may navigate the content using gestures (e.g., hand gestures using the same hand or the other hand) and/or may request that the projection system 106 perform other actions in response to detecting these gestures as discussed in detail below. For instance, the projection system 106 may connect, or be integrated, with other proximate devices, such as telephone systems, television systems, stereo systems and the like. In one such example, when a telephone in the house rings, the projection system 106 may identify the calling number and may project this number on the hand of the user 102. In another example, the user 102 may request that the projection system 106 project a television remote control onto the hand of the user 102. After doing so, the projection system 106 may detect selections made by the user 102 via the projected remote control and may control the television accordingly.

According to some embodiments, projection system 106 connects or is integral with a video conferencing system, displaying received video on the display medium. In this example, projection system 106 can include a camera and microphone for recording the user's image and voice respectively. The projection system 106 can also be associated with a sound emission device (e.g. headphones attached to the projection system 106 or speakers that form part of a home audio system associated with the projection system 106) to allow the user to hear the audio associated with the video conference. Since the display medium can be located on a table or surface of the user, among other possibilities, the user can answer and participate in the video conference without the need for using video conference systems that may require the user's presence in a particular room.

While FIG. 4 illustrates the projection system 106 using the hand of the user 102 as the display medium, other implementations may use any other surface of the user or any other surface of an environment surrounding the user as the display medium. For instance, the projection system 106 may project content onto a specified portion of a table, wall or the like. Furthermore, in some instances, the user 102 may employ gestures to define a size of the projection, subject to the limits of the underlying projection device 110. For instance, the user 102 may use his hand to trace a box on the table-top, instructing the projection device to project the content in a size approximately equal to the size of the traced box.

Figure 5:
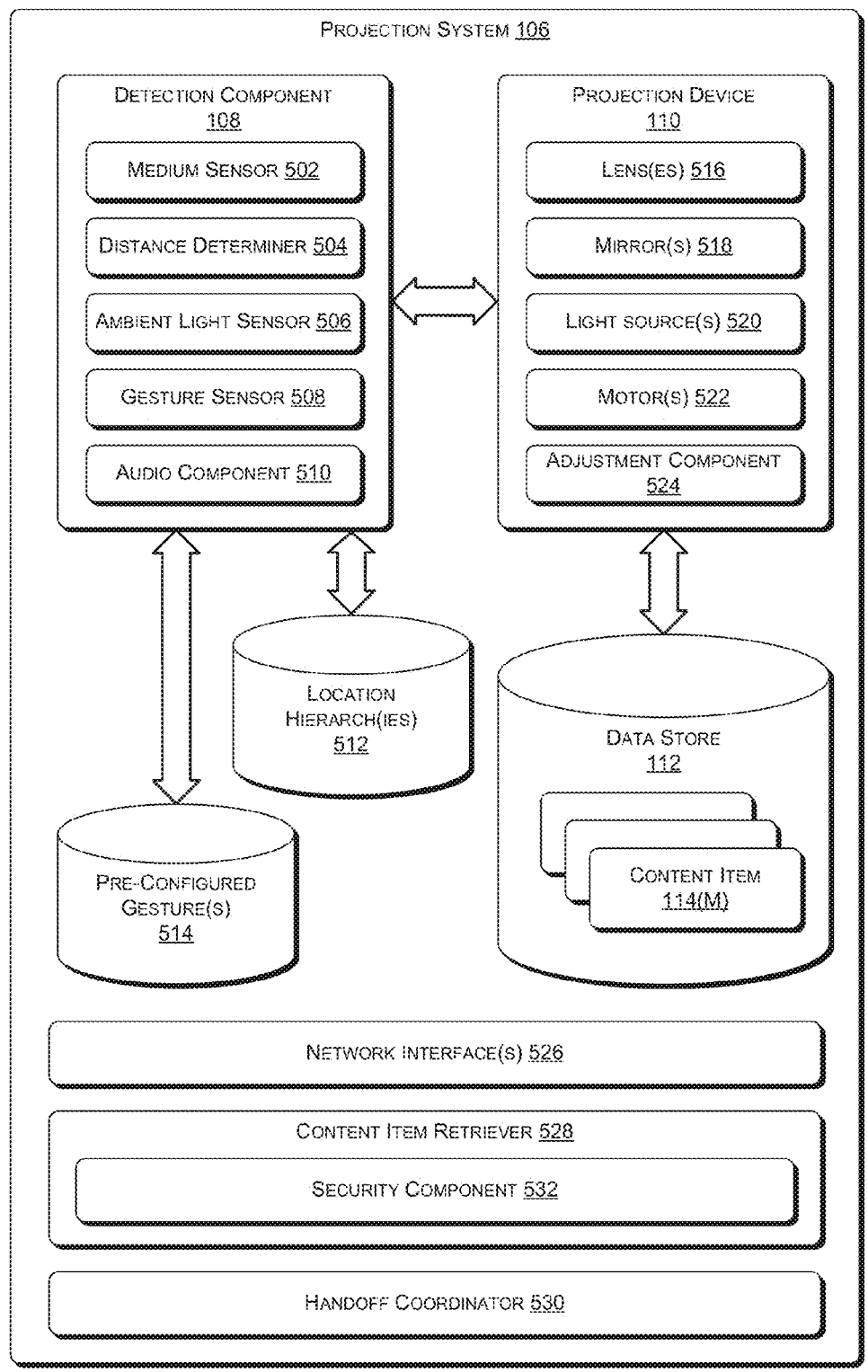
FIG. 5 is a block diagram illustrating selected modules in an example projection system that functions to detect a location of a non-powered medium and project digital content thereon. This example system also functions to detect gestures of a user and perform pre-configured actions in response.

FIG. 5 shows selected modules in an illustrative projection system that functions to detect a location of a non-powered medium and project content thereon. This system also functions to detect gestures of a user and perform pre-configured actions in response. Each component shown in the projection system may include volatile and nonvolatile memory, removable and non-removable media implemented in any type or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems or any other medium which can be used to store the desired information and which can be accessed by a computing device.

As discussed above, the projection system 106 may include a detection component 108, a projection device 110 and a data store 112 storing one or more content items 114(1)-(M). The detection component 108 may comprise a camera, a hardware token reader, infrared detector or the like and functions to detect a presence and a location of a non-powered medium on which to project content. In at least one embodiment, detection component 108 can also detect the presence, location and identify of at least one user. For example, in addition to detecting the presence of a medium, the detection component can identify the user, for example, by recognizing a unique combination of rings worn on the fingers of a user. The rings, as each maintains a defined shape, color and/or size, may also be used to monitor/track movement and gestures of the hand. As illustrated, the detection component 108 includes a medium sensor 502, a distance determiner 504, an ambient light sensor 506, a gesture sensor 508 and an audio component 510.

The medium sensor 502 detects a presence of a display medium, such as a reflective sheet or a surface of the user, in any of the manners discussed above. For instance, the sensor 502 may receive an indication of a display medium via visible markers or invisible markers (e.g. infrared markers) located on or within the display medium. In some embodiments, the sensor 502 may detect a medium via unique hardware tokens embedded within display mediums or via motion sensing, facial recognition, voice recognition or any other suitable technology.

In some instances, the medium sensor 502 actively scans a predetermined proximity for the presence of one or more display mediums. In instances where a particular location (e.g., a house of the user 102) includes multiple projection systems spread through the location, the medium sensor 502 may access a database storing one or more location hierarchies 512. Each of the location hierarchies 512 comprises a prioritized order in which the medium sensors 502 of the various projection systems 106 should scan for a particular medium. For instance, a display medium associated with a first user may be associated with a first location hierarchy while a display medium for a second user may be associated with a second location hierarchy.

Figure 7:
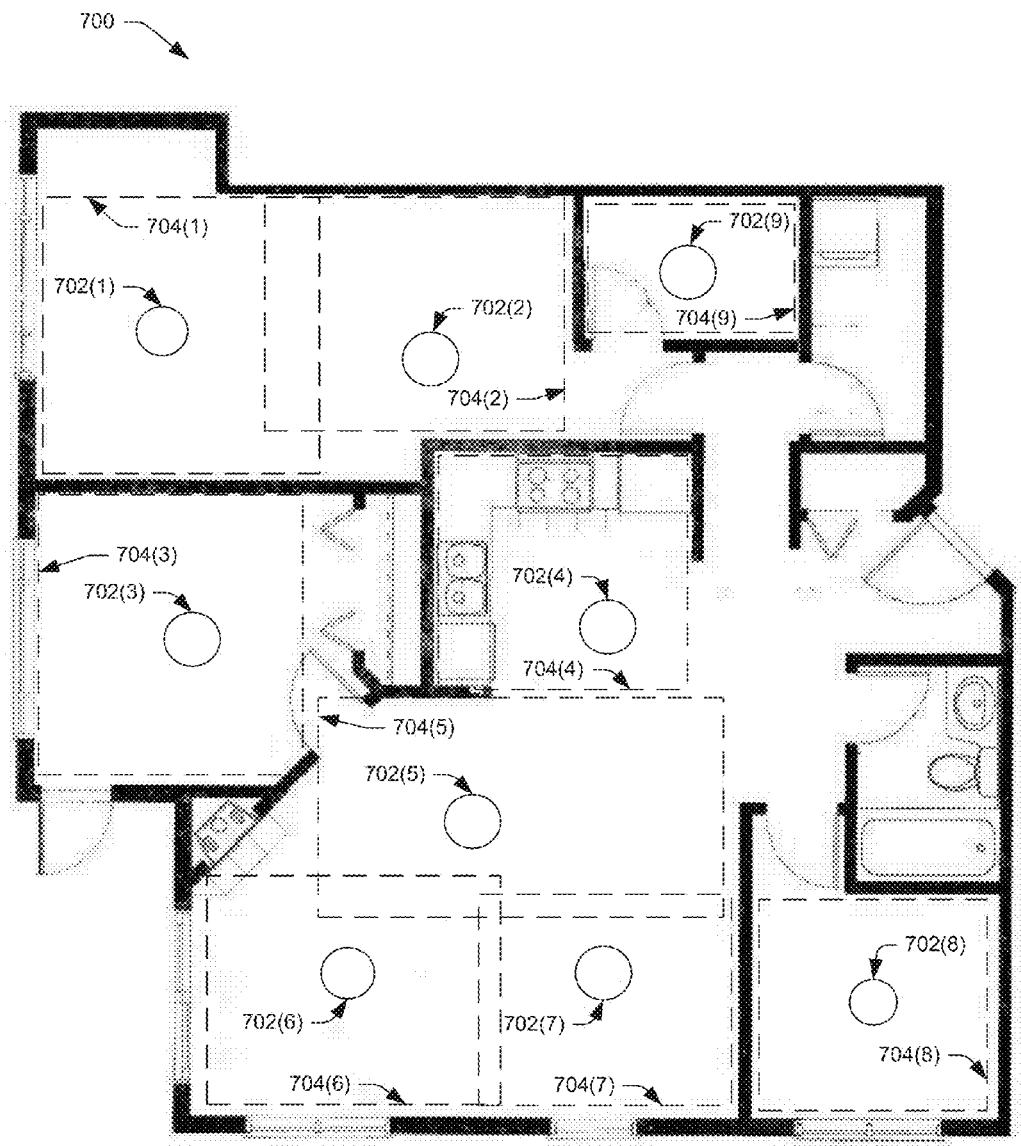
FIG. 7 illustrates a plan view of an illustrative environment that includes multiple projection systems. Each projection system covers a respective zone to allow a user to navigate the environment without ceasing the projection of digital content.

To give an example, a first user may often spend time in the morning in his or her home office, while rarely spending time in the living room. A second user living in the same house, meanwhile, may spend a great deal of his or her time in the morning in the living room while rarely visiting the home office. As such, a location hierarchy 512 associated with the first user may indicate that the medium sensors 502 should first scan for the first user in the morning in the home office before scanning the living room. A location hierarchy 512 for the second user may indicate the opposite. In this example, the location hierarchies are based upon past interactions of the users with the projection system. However, the location hierarchies 512 may be user configurable in other implementations. FIG. 7 and a corresponding discussion illustrate and describe the location hierarchies 512 in greater detail.

The distance determiner 504, meanwhile, serves to determine a distance between the projection device 110 and the detected display medium to enable the projection device 110 to adjust components of the device. For instance, the projection device 110 may adjust a lens, mirror and/or a light source of the projection device 110 based at least in part on the distance between the medium and device as discussed in detail below.

The distance determiner 504 may determine a distance between a display medium and the projection device 110 in any suitable manner. For instance, the determiner 504 may calculate this distance based on an amount of time that it takes for light emitted from the projection device to reflect back to the projection device 110 and/or the distance determiner 504. Conversely, the distance determiner 504 may use facial recognition, motion sensing or any other known techniques to determine this distance between the display medium and the projection device 110. This determined distance may also be used to determine a precise location of the display medium.

The ambient light sensor 506 measures an amount of ambient light in an environment surrounding the detected display medium and/or an amount of ambient light present on the detected display medium. In response to measuring the ambient light, the ambient light sensor 506 provides this information to the projection device 110 to allow the projection device 110 to correspondingly vary the intensity of projected light. Furthermore, the ambient light sensor 506 may measure continuously or periodically this amount of ambient light to allow the projection device 110 to adjust dynamically the intensity of the projected light. As a result, the user notices no or very little change in the brightness of the projection despite potentially changing ambient light conditions.

In the example where the display medium includes one or more infrared markers, the ambient light sensor 506 may measure the amount of ambient light detected on the display medium. As discussed above, the display medium may include multiple markers (e.g., one marker in each corner), in which case the ambient light sensor 506 may measure the ambient light at each of multiple locations on the display medium. After the sensor 506 provides this information to the projection device 110, the projection device 110 may then adjust dynamically different portions of a light source of the projection device 110 to account for the different ambient light conditions at the different locations of the medium. For instance, the projection device 110 may brighten a first portion of a light source servicing a first portion of the display medium while dimming a second portion of the light source servicing a second portion of the display medium.

Next, the gesture sensor 508 serves to detect one or more pre-configured user gestures captured as data patterns stored in a database 514 and causes the projection system 106 to perform a corresponding action. The gesture patterns stored in the database 514 are associated through a data structure with corresponding actions, so that upon detection of a gesture, the corresponding action is performed. For instance, the gesture sensor 508 may detect that a user desires to navigate content, as discussed above with reference to FIG. 2. The gesture sensor 508 may also detect and interpret any other preset or user-configured gestures.

For instance, when a phone rings in a house, the gesture sensor 508 may detect a gesture comprising a user's hand in the shape of a telephone. In response, the projection system may communicate with the telephone system to answer the incoming call. In this example, the audio component 510 may include a microphone and a speaker system to allow the user to conduct the phone call from the environment surrounding the projection system 106. The projection system 106 can also, based upon the identity of the caller and most likely intended receiver, display the call information on a defined or selected medium in the location of the intended receiver. For example, if the mother of a user calls while the user is in the living room, the projection system 106 can display the caller identification (caller ID) information on a surface defined by the user (e.g., a wall of the living room, a table in the living room, the user's hand).

In another example, the user 102 may gesture in a particular manner that requests projection of a virtual telephone keypad onto a display medium, such as the hand of the user. The detection component 108 may then detect key selections made by the user 102 and may place the telephone call when the user 102 requests. Again, the audio component 510 may allow the user to conduct the placed phone call via the microphone and speaker. In still another example, the gesture sensor 508 may detect a gesture requesting that the projection system 106 project a virtual remote control onto a hand of the user 102. After doing so, the detection component 108 may then capture the selections of the user and may control the television accordingly. In another example, the projection system 106 may project a keyboard onto a hand of the user, allowing the user 102 to compose a text-based document, an email, or perform any other action typically performed on a personal computing device.

While a few example pre-configured gestures 514 have been discussed, users may configure the projection system 106 to detect any other number of gestures causing performance of any other number of identified actions. For instance, users may use gestures to adjust a setting of a thermostat, adjust settings (e.g., a volume) of a sound system, open or close window coverings (e.g., blinds) and the like.

Furthermore, a user may interact with the projected content and with the projection system 106 in manners other than gestures. For instance, the audio component 510 within the detection component 108 may receive and interpret aural commands uttered by the user. For instance, the projection system 106 may allow the user to request and/or navigate content by issuing different aural commands, such as "close book," "launch browser," "launch email client" and the like.

The projection device 110, meanwhile, can include any of one or more lenses 516, one or more mirrors 518, one or more light sources 520, one or more motors 522 and an adjustment component 524. The lenses 516, mirrors 518 and light sources 520 collectively function to project content from the content items 114(1)-(M) onto the display medium. The motors 522 function to move the projection device about a fixed point so as to continue projecting the content onto the current location of the display medium determined by the medium sensor 502. Stated otherwise, the motors 522 receive input from the medium sensor regarding the potentially changing location of the display medium and, in response, move the focus of the projection device to these changing locations. As such, the projection device as a whole may remain affixed to a mount and stationary while the components of the projection device may move to track the located medium and to maintain a quality of the projection.

In some instances, the motors 522 may allow the focus of the projection device 110 to move within a predefined area that collectively defines a zone within which the projection device 110 may project. This zone of coverage may be any shape, including rectangular, circular, oval or polygonal depending on the desired configuration of the projection device 110.

The adjustment component 524 adjusts the lenses 516, mirrors 518 and/or light sources 520 in response to detected display conditions, such as a distance between the display medium and the projection device (measured by the distance determiner 504) and/or an amount of ambient light (measured by the ambient light sensor 506). For instance, the adjustment component 524 may adjust the lenses 516 and mirrors 518 to maintain a focus and field of view of the projected content. By doing so, the adjustment component 524 compensates for any variations in tilt in the display medium as well as variations in the distance between the display medium and the projection device 110.

For example, when a user holding the non-powered medium 104 of FIG. 1 tilts the medium 104, the adjustment component 524 may alter the lenses 516 and mirrors 518 to compensate for this tilt. The alterations effectively modify how the image is being projected so that when the projected image contacts the newly tilted surface, the image appears normal. As a result of these adjustments, the content appears to the user 102 to maintain focus and a proper field of view.

Additionally or alternatively, the adjustment component 524 may adjust the intensity of the light sources 520 based on a distance between the display medium and the projection device, a tilt of the display medium and/or a detected ambient light. For instance, when the user 102 moves the non-powered medium further away from the projection device 110 and into an environment having a higher ambient light, the adjustment component 524 may increase the intensity of the light sources 520. Conversely, when the user moves closer to the projection device 110 and into an environment having a lesser ambient light, the adjustment component 524 may decrease the intensity of the light sources 520. In addition and as discussed above, the adjustment component 524 may adjust different portions of the light sources 520 in different manners to account for varying ambient light present on different portions of the display medium.

FIG. 5 further illustrates that the projection system 106 may include one or more wired or wireless network interfaces 526, a content item retriever 528 and a handoff coordinator 530. The network interfaces 526 allow the projection system 106 to communicate over a public or private network, such as the Internet, cable networks, cellular networks, wireless networks and wired networks.

The content item retriever 528, meanwhile, operates to receive requests for content items stored on the data store 112 or in a remote data store and, in response, to pass this content to the projection device 110 for projection onto the display medium. In some instances, the content item retriever 528 comprises a computing device having processor(s) and instructions stored in memory to receive the request and retrieve the desired content item over the network interface 526.

In addition, the content item retriever 528 includes a security component 532 in some implementations. The security component 532 maintains security of the content that the projection device 110 projects onto a non-powered medium. For instance, the security component 532 may ensure that a user requesting content has permissions allowing the user to receive the content.

The security component 532 may make this determination in any number of ways. For instance, the security component may request that the user provide a password, either aurally or via a particular gesture detected by the gesture sensor 508. In still another implementation, the projection device 110 may project a keyboard onto a non-powered medium to enable the user to enter and submit a password. Conversely, the security component 532 may utilize facial recognition technology, voice recognition technology, or other biometric sensors to identify the requesting user and, with this information, to determine whether the user has permissions to access the requested content.

Figure 9:
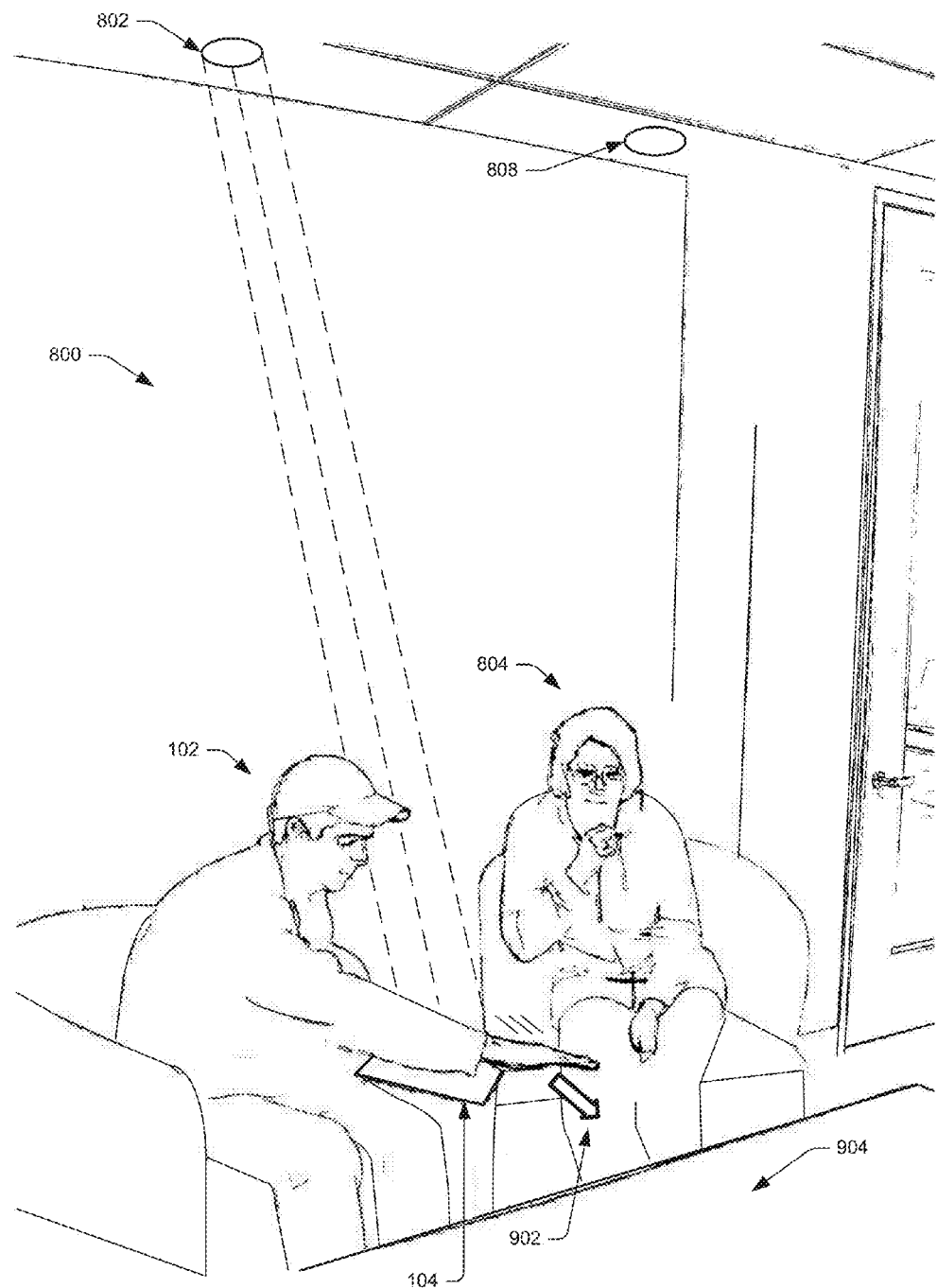
FIG. 9 illustrates the environment of FIG. 8 while a user performs a gesture for the purpose of moving the projection of the digital content to a different location.
Figure 10:
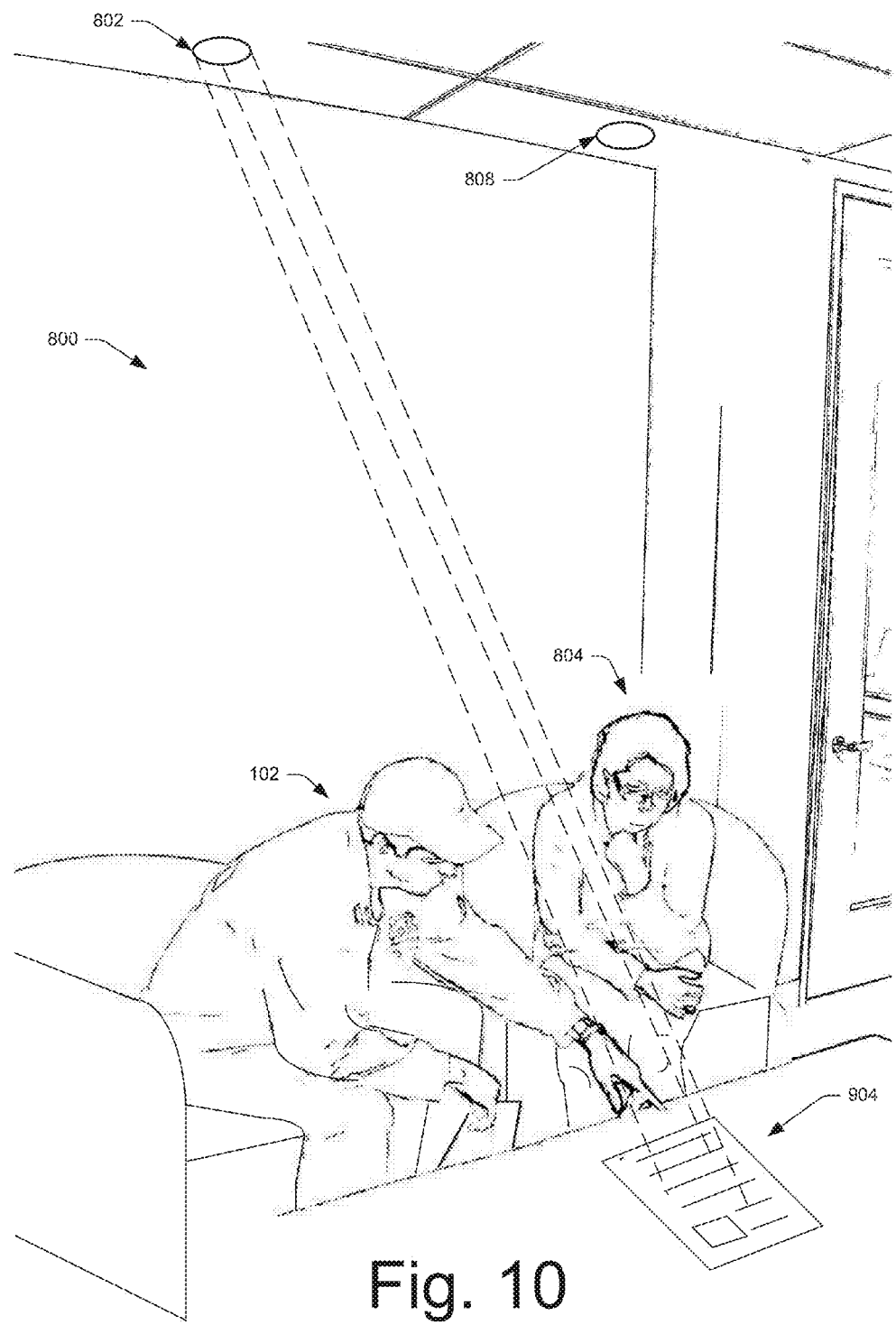
FIG. 10 illustrates the environment after the user performs the example gesture shown in FIG. 9. Here, the projection system now projects the digital content onto the new location, as requested.
Figure 11:
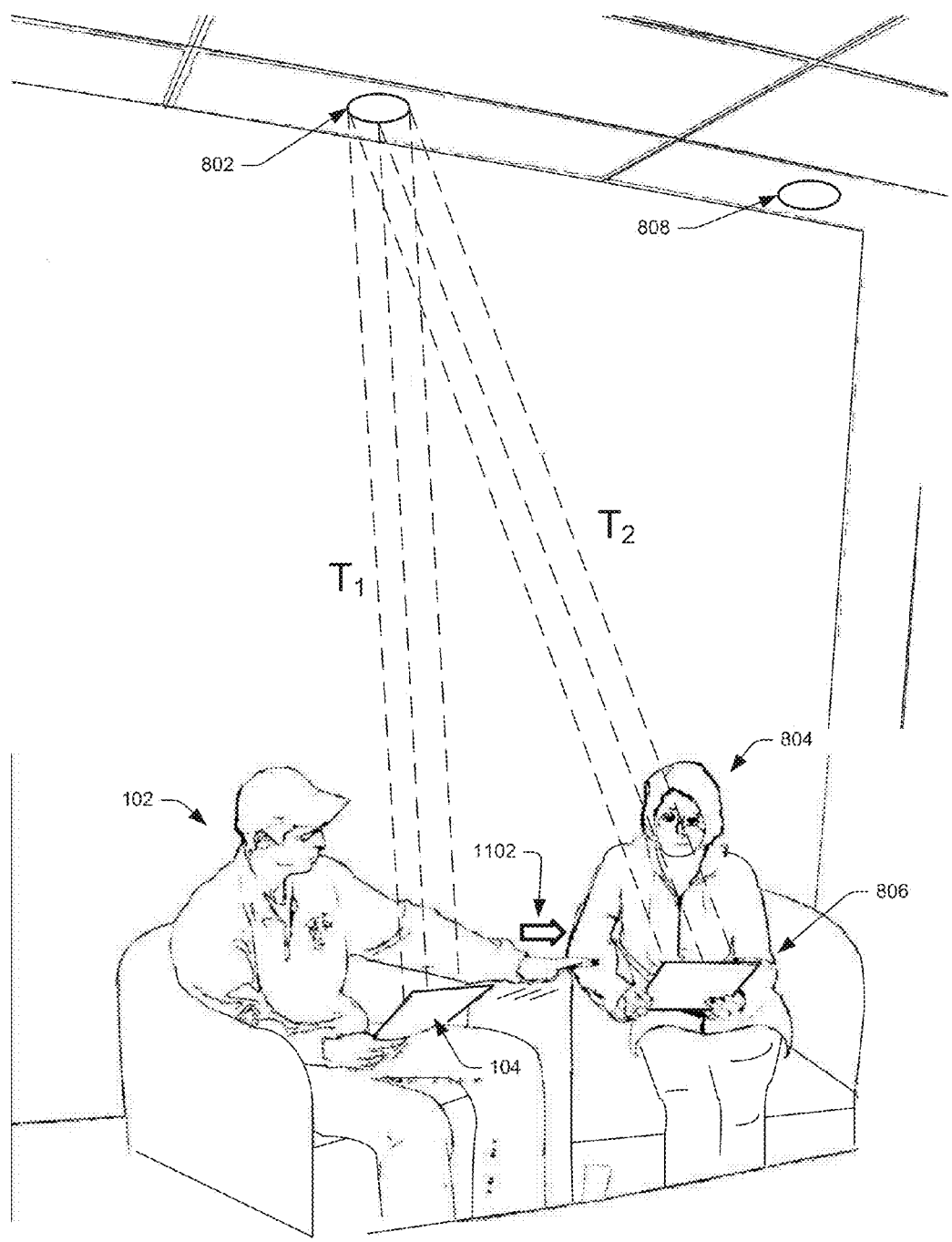
FIG. 11 illustrates a sequence that includes a user from FIG. 8 performing a gesture to share digital content with another user. This sequence also includes the projection system moving the projection to share the digital content in response to the detected gesture.

In some implementations, the security component 532 also functions to enable a user accessing secure content to grant these permissions to other users. For instance, when a user consumes projected content that is password protected, the security component 532 may allow this user to share this secured content by performing a particular gesture or by otherwise instructing the system to grant the other user temporary or permanent access to the content. FIGS. 9-11 and the accompanying discussion describe sharing techniques in greater detail.

The handoff coordinator 530, meanwhile, serves to conduct handoffs between multiple different projection devices associated with respective projection systems. For instance, in response to receiving an indication from the medium sensor 502 that the display medium has moved into a zone covered by both a first projection device that currently projects content and a second projection device that does not, the coordinator 530 may initiate the handoff to the second projection device.

This includes communicating with the second projection device over the network interface 526 and instructing the second projection device to locate the medium, synchronize to a position in the media item being projected and begin projecting the content that the first projection device currently projects. As such, both the first and the second projection devices may project the content concurrently. Next, as the medium sensors of the first and/or second projection systems detect that the medium has transitioned to a zone covered solely by the second projection device, the handoff coordinator 530 may complete the handoff by instructing the second projection device to take over sole control of the projection while ceasing projection from the local projection device.

Figure 6:
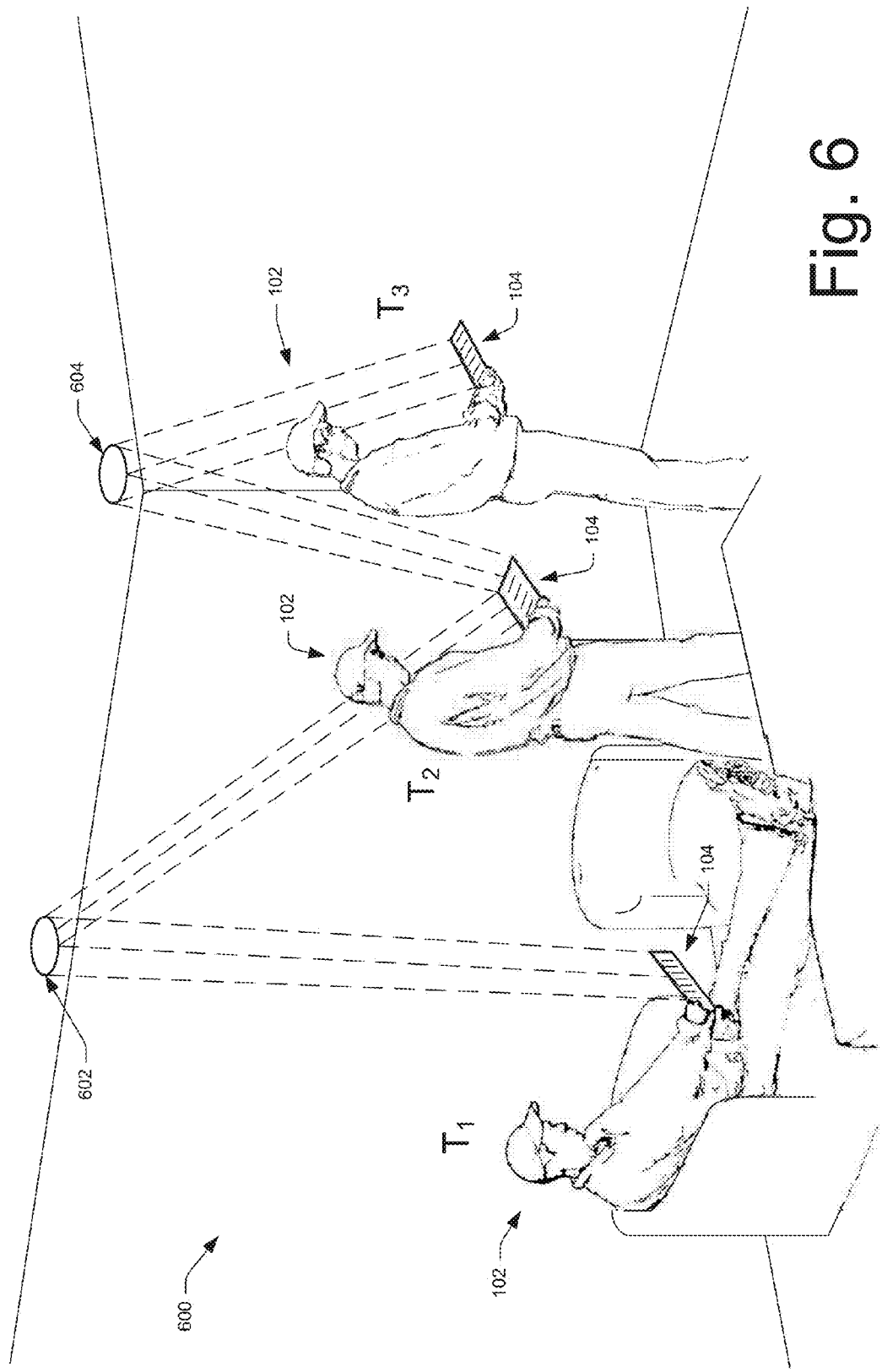
FIG. 6 illustrates an environment that includes multiple projection systems for projecting digital content onto a non-powered medium.

FIG. 6 illustrates an illustrative environment 600 that includes two projection systems 602 and 604 for projecting content onto a non-powered medium 104. Each projection system 602 and 604 is essentially configured as system 106 described above with respect to FIG. 5. The non-powered medium 104 comprises a mobile presentation element held by the user 102, although the non-powered medium 104 could comprise a surface of the user 102 or a surface within the environment 600. As illustrated, at a time "$T_1$," the user 102 holds the non-powered medium 104 within a zone of coverage of the first projection system 602. As such, the first projection system 602 has located the medium 104 and currently projects content onto the medium 104 at the detected location.

At a time "$T_2$," however, the user 102 has moved the medium 104 into a zone to which both the first and second projection systems 602 and 604 are configured to project. In response to the medium's movement, the handoff coordinator 530 of the first projection system 602 contacts the handoff coordinator 530 of the second projection system 604 and initiates a handoff between the first and second systems. As such, at this time, both the first and second projection devices project some or all of the content onto the medium 104.

At a time "$T_3$," the user 102 has moved the medium 104 into a zone that the second projection system 604 solely covers. As such, the handoff is complete and the second projection system has assumed sole responsibility of projecting the content to the medium 104.

FIG. 7 illustrates a plan view of an illustrative environment 700 that includes multiple fixed projection systems 702(1), 702(2), . . . , 702(8). Each projection system covers a respective zone 704(1), 704(2), . . . , 704(8) to allow a user to navigate the environment without ceasing the projection of content. That is, a user 102 may move about the zones covered by the multiple projection systems while continuing to consume content projected onto a non-powered medium 104. As discussed immediately above, these projection systems may function to handoff the projection of the content amongst one another as the user 102 moves about these different zones.

Furthermore, in order to initially detect a location of the user 102 and/or of the display medium 104, the projection systems may reference a location hierarchy 512. The location hierarchy may indicate where the systems should begin scanning for a particular user and/or a particular medium. For instance, the location hierarchy may indicate where the user or medium is most likely to reside at a given time. As such, the location hierarchy may indicate that a user is most likely to reside within his or her den in the early morning hours, with the next most likely location being the kitchen. As such, during these morning hours the projection system 702(8) in the den may begin to attempt to detect the user and/or the medium within the corresponding zone of coverage 704(8). The projection system may dynamically modify the location hierarchy 512 by learning user location patterns over the course of time. To detect the user and/or the medium, the projection systems may use any of the techniques describe above including referencing infrared markers embedded within the medium, facial or voice recognition, motion sensing and the like.

If the projection system 702(8) does not detect the user or the medium, then the projection system 702(4) in the kitchen may next attempt to detect the user or the medium within a zone of coverage 704(4). The systems may progress down the order of the location hierarchy until detecting the user or the medium. If the user and/or the medium is not found, the systems may cease looking for the user and/or the medium or may continue to cycle through the location hierarchy. It should be understood that one or more of the multiple fixed projection systems 702(1), 702(2), ..., 702(8) may scan their respective zones at substantially the same time, whether using the display hierarchy or not, in order to increase the speed of detecting the user or display medium. While FIG. 7 illustrates that a user's house may include one or more projection systems, other buildings or locations may similarly include one or more of these systems. For instance, the user may have such a system within his or her car, office and the like.

In addition to the fixed projection systems 702(1), 702(2), ..., 702(8) finding and following a display medium or user through respective zones 704(1), 704(2), ..., 704(8), the projection systems can also be used as a security or monitoring device, capturing an image in one zone and projecting that image to a display image located in another zone. For example, if a parent is in zone 704 (8), a camera associated with projection system 702(6) can be used to monitor children in zone 704(6), with projection system 704(8) being used to project this content onto a display medium visible by the parent.

In some instances, the projection system is operable to project context sensitive information to the display medium of users as they travel from one zone to the next. In addition to location, the context could also be based upon a time of day, a date, whether other users are located within a proximity to the user and whether a particular user is within the proximity to the user, among other possibilities. For example, when a user is in the zone that includes the kitchen, the user may be reminded that a light bulb in the kitchen needs to be replaced by projecting this onto the display medium. In some embodiments this information may be projected only during times and days the user has designated as eligible for the particular activity, such as on weekends.

In some instances, the projection system is operable to synchronize the consumption of content by the user. For example, the user can stop consuming content in one location for various reasons but return to the same content reference point (e.g. a page in an eBook, a frame of a video, a slide in a presentation) when the user is at a different physical location and/or at a different time. When the user is again identified in a different location and/or at a later time, the projection system can resume/continue the content at the same content reference point where the user previously stopped. As a result, the user can resume consuming the content after moving to a new physical location and/or later in time without missing any of the content. For example, if the user is in the kitchen in the morning reading the newspaper at page 10 and stops to go to the grocery store, when the user returns later in the day, the projection system can resume projecting page 10 of the newspaper on the medium of the user. The user may configure/specify that the projection system resumes regardless of a new physical location, resumes within a selected period of time, resumes if the user requests resuming at the same point of the content or resumes based upon other selected criteria. In one embodiment, a plurality of projection systems are coupled so that as the user moves from location to location, each projection system identifies the user and resumes projecting the same content to the identified user. For example and continuing the example above, if the user above leaves home and, rather than going to the grocery store, the user boards an airplane, a projection system on the airplane can project the newspaper onto the medium of the user in the airplane exactly where the user left off. The user similarly could also resume consuming other content such as a movie, a magazine, pictures, etc. on the airplane.

Similarly, the projection system can coordinate the presentation of the content at multiple locations to multiple users. For example, one user may host a presentation, synchronizing the content being displayed (e.g. slides, images, video) with one or more other users. In some embodiments, the video system may be configured to also host a text chat, telephonic conference or video conference to allow the participants to communicate while the users are sharing the synchronized content.

In addition to techniques described above, the projection systems described herein further allow for collaboration amongst multiple different users of these systems. FIGS. 8-11 and the following discussion illustrate and describe several example scenarios, although the described techniques enable many other similar or different usage scenarios.

Figure 8:
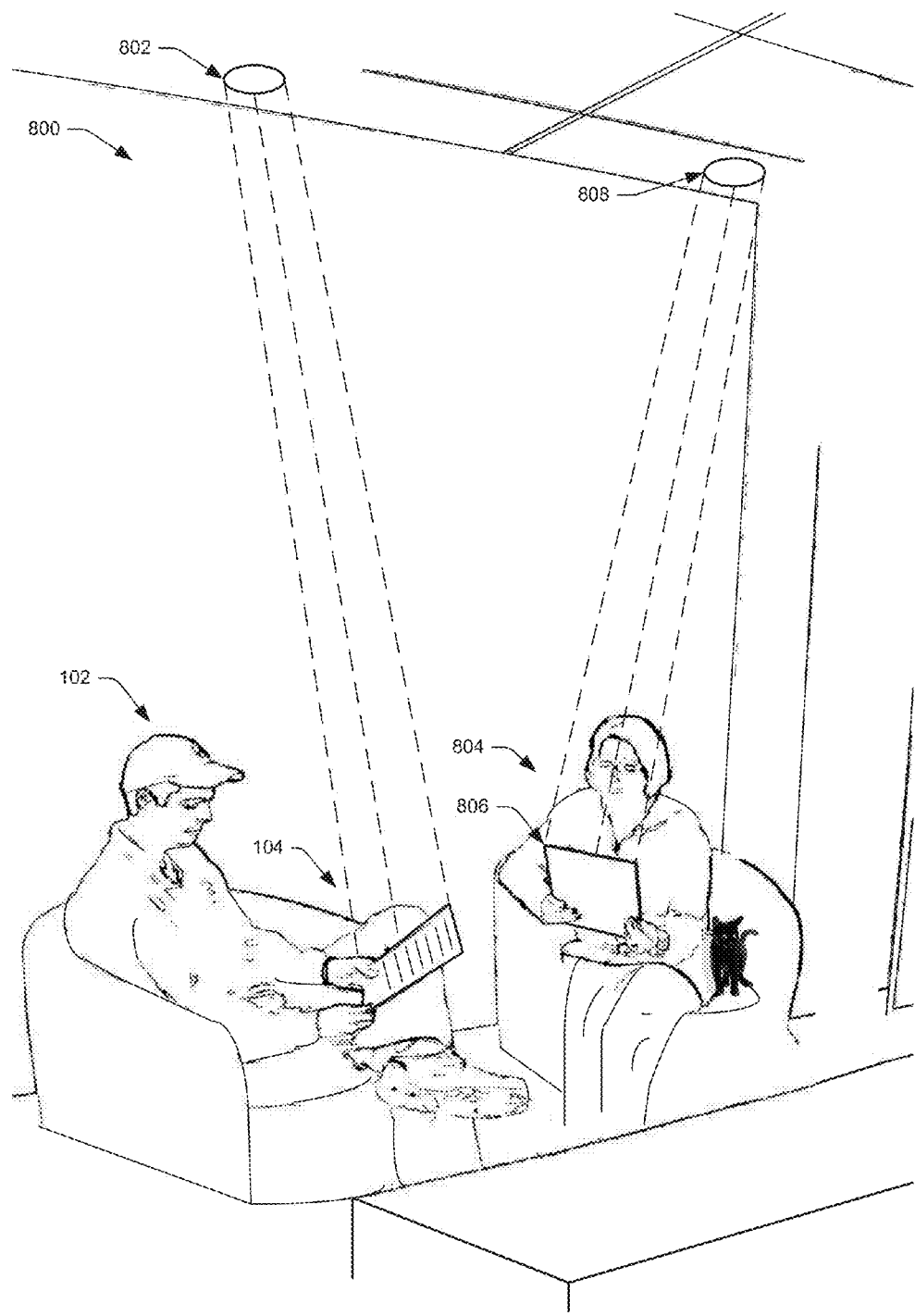
FIG. 8 illustrates an environment where multiple people may each consume projected digital content from a same or a different projection system.

FIG. 8 illustrates an environment 800 where multiple people may each consume projected content from a same or a different projection system. Here, a first user 102 consumes content on a non-powered medium 104 that a first projection system 802 projects, while a second user 804 consumes content on a non-powered medium 806 that a second projection system 808 projects. As discussed above, the content may comprise text, image, videos or the like. Although users 102 and 804 may each be consuming different content, in some embodiments, the user 102 and user 804 may be consuming the same content at the same time on their respective display mediums. The content being displayed to the users 102 and 804 may be customized for each user in various ways, such as to only show particular character's lines in a screen play or to depict a different ordering of test questions for an exam. In a classroom each student can receive a handout or notes on a medium or surface.

FIG. 9 illustrates the environment 800 while the first user 102 performs a gesture 902 for the purpose of moving the projection of the content from the non-powered medium 104 and to a different location 904. Here, the new location 904 is a table-top within the environment 800, although the first user 102 could request via a gesture, voice command or the like to move the projection of the content to a different location, such as a wall, a surface of the first or the second user or the like.

As discussed above, the gesture sensor 508 of the first projection system 802 may detect this gesture made over the top of the non-powered medium 104 and, in response, may perform the pre-configured action of moving the content to a new location. Here, the gesture sensor 508 determines via reference to the database of pre-configured user gestures 514 to move the projection of the content to a location in the direction of the gesture 902. In some instances, the faster the gesture 902, the further the gesture sensor 508 instructs the projection device to move to the projection in the corresponding direction. In other instances, meanwhile, the longer in distance the gesture 902, the further the gesture sensor 508 instructs the projection device to move to the projection. Furthermore, in instances where the user 102 requests to move the content to a zone covered by a different projection system, the local projection system 802 may instruct the different projection system to project the content at the appropriate location indicated by the gesture.

While FIG. 9 describes an example gesture 902, other implementations may use any other similar or different gestures for acting upon the content or otherwise making system requests as described above.

FIG. 10 illustrates the environment 800 after the first user 102 performs the example gesture 902 shown in FIG. 9. Here, the projection system 802 now projects the content onto the new location 904, in accordance with the gesture 902. As a result of this move, the first user 102 is able to share information with the second user 804 at a location that is easily viewable by both users, rather than simply at a location that is viewable by the first user but not the second (e.g., on the non-powered medium 104 of the first user 102).

As depicted in FIG. 11, in addition to moving the projection of the content from one non-powered medium controlled by a first user to a location in an environment generally viewable by both the first and the second users, the projection system may also enable the first user 102 to share information from a medium 104 and to a medium 806 of the second user 804.

FIG. 11 illustrates a time sequence that includes the first user 102 performing a gesture 1102 to share content with the non-powered medium 806 of the second user 804. At a time "$T_1$," the first user 102 performs the gesture 1102 by moving his hand toward the non-powered medium 806 of the second user. In some instances, when the first user 102 gestures in this manner, the projection system 802 first attempts to locate another identified non-powered medium (e.g., an identified presentation element) before projecting the content on a surface within the environment 800 generally. If the projection system 802 locates another identified non-powered medium (such as medium 806 in this example), then the projection system 802 may project the content onto this medium. If the projection system 802 is unable to locate such a medium, then the system 802 may project the content onto a surface of the environment 800. In other implementations, the gestures for moving the content to an environmental surface and for sharing with another medium may be entirely different. Thus, the system captures the different gestures, analyzes them relative to the gestures in the database 514, and interprets them for the correct action.

At a time "$T_2$," the gesture sensor 508 of the projection system 802 has detected and interpreted the gesture 1102 and, in response, has additionally projected the content previously projected onto the non-powered medium 104 of the first user 102 onto the non-powered medium 806 of the second user 804. As such, first user 102 has been able to conveniently share content by performing a gesture and requesting that the projection system move the content to the medium of the second user 804.

In some implementations, the projection system 802 may perform some converting prior to moving the projection of the content from the medium 104 of the first user 102 and to the medium 806 of the second user 804. For instance, the projection system 802 may identify the user associated with the medium 806 and may determine one or more preferences of the user. The system may then project the content onto the medium 806 in accordance with these preferences. For instance, the projection system 802 may determine a preferred font size of the second user 804 and, in response, may project the content on the medium 806 of the second user 804 in that preferred font size. Additionally or alternatively, the system may determine a native language of the second user 804 and may translate the projected content before projecting the translated content onto the medium 806 of the second user 804.

Furthermore, the content that is passed from a medium of the first user 102 to a medium of the second user 804 may be limited in some form. For instance, the content being projected onto the medium 806 of the second user 804 may be "read only" and, as such, the second user 804 may be unable to modify the content.

Figure 12:
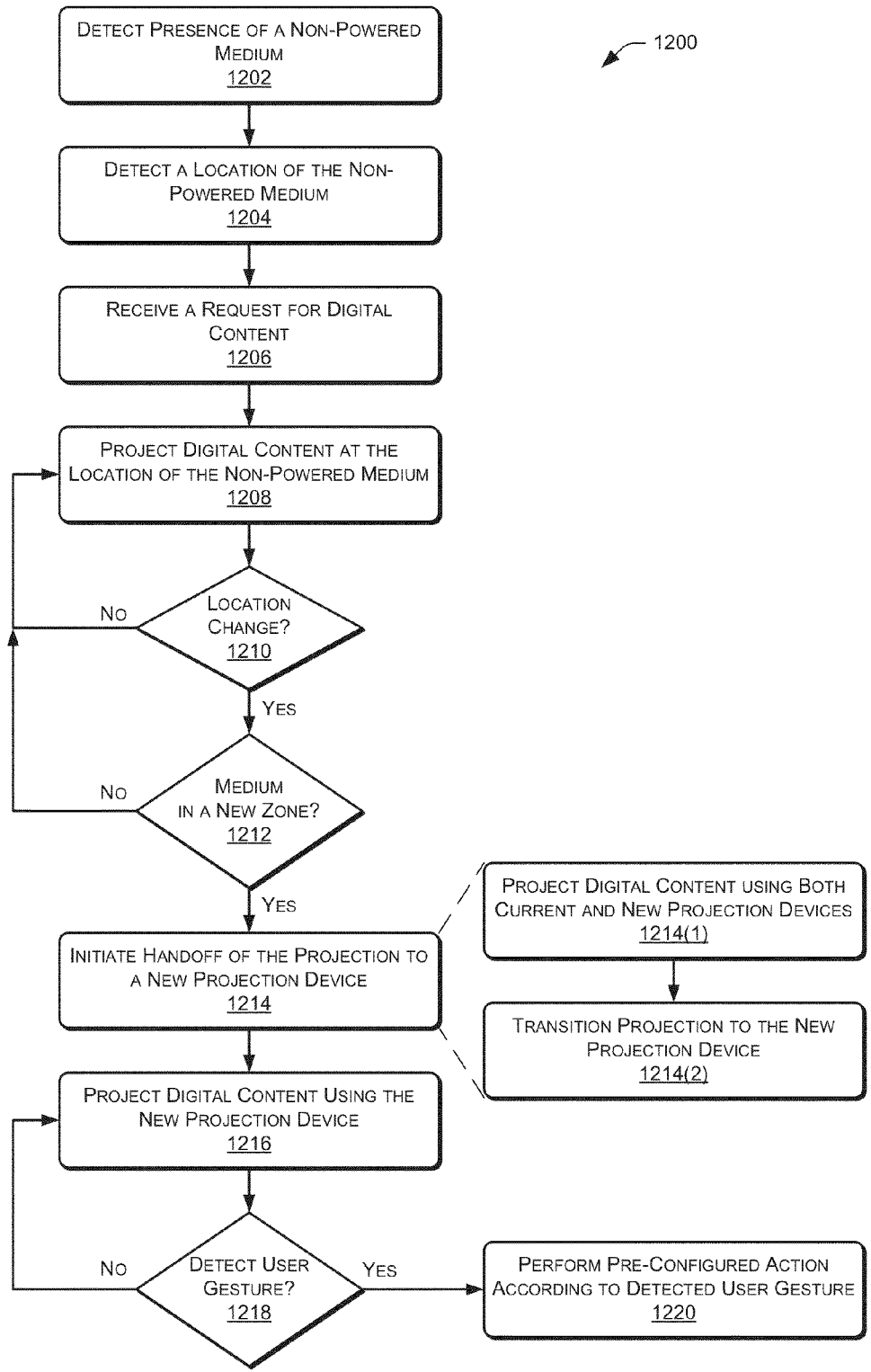
FIG. 12 is a flow diagram of an illustrative process of locating a medium and projecting digital content onto the medium at the detected location. This process also includes handing off the projection to another projection device, in response to detecting that the medium has moved to a new zone, as well as detecting user gestures and performing corresponding actions.

FIG. 12 shows an illustrative process 1200 of locating a medium and projecting content onto the medium at the detected location. This process 1200 also includes handing off the projection to another projection device in response to detecting that the medium has moved to a new zone as well as detecting user gestures and performing corresponding actions.

The process 1200 is illustrated as a collection of blocks in a logical flow graph, which represent a sequence of operations that can be implemented in hardware, software or a combination thereof. In the context of software, the blocks represent computer-executable instructions stored on one or more computer-readable storage media that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation, and any number of the described blocks can be combined in any order and/or in parallel to implement the process.

At 1202, the projection system detects the presence of a non-powered medium. More particularly, the medium sensor 502 may detect the presence of the medium using any of the techniques described above. At 1204, the projection system detects a location of the detected medium. This may include the distance determiner 504 determining a distance between the medium and the projecting system.

At 1206, the projection system receives a request for content. This request may take the form of a voice command of a user, or the request may be initiated in response to detecting and locating the medium. At 1208, the projection system projects the requested content onto the detected non-powered medium at the identified location. The projection system may persistently store this content locally, or the system may utilize a network interface to retrieve the content from a remote source.

The process 1200 continues to 1210, which queries whether the location of the non-powered medium has changed. If the location has not changed, then the projection system continues to project the content at a current location of the medium. If the location has changed, then the process 1200 proceeds to 1212, which queries whether the location of the medium is within a zone covered by a new projection device. That is, at 1212 a medium sensor asks whether the medium is now located in a zone that is covered by a projection device that is currently not projecting the content to the medium (possibly in addition to remaining in the zone covered by the projection device currently projecting the content). If the medium has not entered a zone covered by a new projection device, then the current projection device continues to project the content at a current location of the medium. If, however, the medium is located in a zone covered by a new projection device, then the projection device currently projecting the content initiates a handoff of the projection to the new projection device at 1214.

Initiating the handoff of the projection at 1214 may include sub-operations 1214(1) and 1214(2). At 1214(1), both the current and the new projection devices project the content onto the medium at the current location of the medium (e.g., as shown at "$T_2$" in FIG. 6). Next, if the location of the medium moves into a zone that is solely covered by the new projection device, then the projection of the content transitions substantially or entirely to the new projection device at 1214(2).

At 1216, the medium has moved into a zone solely covered by the new projection device, and, hence, the new projection device projects the content to the non-powered medium at the current location of the medium. The process 1200 then proceeds to 1218, which queries whether a user gesture is received. If no gesture is received, then the new projection device continues to project the content on the medium at the current location of the medium. Responsive to detecting a gesture, however, the new projection device performs or causes performance of a pre-configured action in accordance with the detected gesture at 1220. For instance, the new projection device may navigate to a different portion of the projected content, may navigate to an entirely new content item, may project the content onto a new medium or may perform or cause performance of any other similar or different action.

The process 1200 thus enables a user to consume content without the need to recharge a portable device or any other component of the projection system. In addition, the process 1200 allows the user to move about by employing projection devices that both track the medium onto which the content is projected and handoff the projection of the content amongst one another. Furthermore, the process 1200 allows the user to navigate the content and/or cause performance of other identified actions by using one or more pre-configured gestures.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system for projecting textual content, comprising:
    a display medium for receiving projected textual content, the display medium including one or more infrared markers located on or within the display medium;
    a projector, including:
        a detection component operable to locate the display medium, detect the one or more infrared markers, and track a position of the located display medium; and
        a projection component, in communication with the detection component, operable to initiate projection of the textual content toward the tracked position of the display medium in response to the detection component detecting the one or more infrared markers.

2. The system of claim 1, wherein the detection component is further operable to detect a presence of the display medium, and wherein the projection component initiates projection of the textual content at a time after the detection component detects the presence of the display medium.

3. The system of claim 2, wherein the detection component is further operable to track a location of the display medium as the location of the display medium changes over time, and wherein the projection component is further operable to project the textual content onto the display medium as the location changes.

4. An apparatus for projecting media content, comprising:
    a detection component operable to detect a medium for receiving projected media content consumable by a user, and operable to track a position of the medium, the medium including one or more infrared markers located on or within the medium; and
    a projection device, in communication with the detection component, operable to project the media content toward the tracked position of the medium, wherein the projection device initiates projection of the media content in response to the detection component detecting the one or more infrared markers.

5. The apparatus of claim 4, wherein the detection component is further operable to identify a change in position of the medium to a second position, and wherein the projection device is further operable to project the media content toward the second position of the medium.

6. The apparatus of claim 4, wherein the medium is portable and the detection component operates to periodically or continuously track the position of the portable medium over time.

7. The apparatus of claim 4, further comprising a content item retriever operating to locally or remotely access the content prior to the projection of the content toward the medium by the projection device.

8. The apparatus of claim 4, wherein the projection device is further operable to dynamically adjust the projection of the content based at least in part upon a detected display condition.

9. The apparatus of claim 8, wherein the detected display condition comprises at least one of: an amount of ambient light of an environment surrounding the medium or an amount of ambient light present on the medium.

10. The apparatus of claim 8, wherein the projection device is further operable to adjust a lens or mirror based at least in part upon the detected display condition to substantially maintain a focus of the projection.

11. The apparatus of claim 8, wherein the projection device is further operable to adjust a lens or mirror based at least in part upon the detected display condition to substantially maintain a field of view of the projection.

12. The apparatus of claim 8, wherein the projection device is further operable to brighten or dim a light source based at least in part upon the detected display condition to substantially maintain a brightness of the projection.

13. The apparatus of claim 4, wherein the projection device is further operable to (1) dim a portion of a light source corresponding to a portion of the medium receiving relatively less ambient light, and (2) brighten a portion of the light source corresponding to a portion of the medium receiving relatively more ambient light.

14. The apparatus of claim 4, wherein the projection device comprises a first projection device and a second projection device, the second projection device operable to project the media content onto the medium in response to the medium moving into a zone of coverage of the second projection device.

15. The apparatus of claim 4, further comprising:
    a second projection device operable to project the media content toward the medium; and
    a handoff coordinator in communication with the detection component and operable to determine when to handoff the projection of media content to the second projection device based at least in part on a location of the medium, wherein the second projection device is operable to project the media content toward the medium at least partly in response to the handoff coordinator initiating a handoff.

16. The apparatus of claim 4, wherein the medium is in a first zone, the apparatus further comprising:
    a second projection device operable to project the media content towards the medium when the medium is in a second zone.

17. The apparatus of claim 16, wherein the apparatus is operable to project context sensitive information towards the medium based at least in part on whether the medium is in the first zone or the second zone.

18. The apparatus of claim 16, wherein the apparatus is operable to prevent the projection of selected media content towards the medium based at least in part on the position of the medium.

19. The apparatus of claim 18, wherein the selected media content is based at least in part on preferences selected by the user.

20. The apparatus of claim 4, wherein the apparatus further includes a camera for capturing at least one image of at least a portion of a first zone, and the projection device is configured to project the captured at least one image toward the medium in a second zone.

21. The apparatus of claim 4 further configured to:
receive a voice command from the user; and
perform an action associated with the voice command.

22. The apparatus of claim 4, wherein the medium comprises a portion of a user.

23. The apparatus of claim 4, wherein the projection device initiates projection of the media content at a time after the detection component detects the medium.

24. The apparatus of claim 4, wherein the detection component is further operable to detect a user associated with the media content using at least one of facial recognition, voice recognition, and motion sensing.

25. The apparatus of claim 4, wherein the detection component includes a camera positioned to capture at least one image, the apparatus further configured to transmit the at least one image to a second user located remote from the apparatus.

26. The apparatus of claim 4, wherein the detection component is further operable to detect a user gesture and the projection device projects specified media content in response to the user gesture.

27. The apparatus of claim 4, further comprising a light source that operates to provide light when the projection device is not projecting media content.

28. A computer-implemented method for projecting digital content onto a non-powered medium, the computer-implemented method comprising:
as implemented by one or more computing devices configured with specific executable instructions,
scanning proximities of multiple projection devices in a predefined order to detect a position of the non-powered medium toward which to project digital content;
projecting the digital content toward the non-powered medium at least partly in response to detecting the position; and
continuing to project the digital content toward the non-powered medium as the position of the non-powered medium changes.

29. The computer-implemented method of claim 28, wherein detecting the position comprises scanning a zone to locate the non-powered medium.

30. The computer-implemented method of claim 28, wherein a first projection device projects the digital content toward the non-powered medium, and further comprising handing off the projection of the digital content to a second projection device.

31. The computer-implemented method of claim 30, wherein handing off the projection of the digital content is initiated at least partly in response to determining that the non-powered medium is positioned such that the first and second projection devices are both capable of simultaneously projecting the digital content towards the non-powered medium.

32. The computer-implemented method of claim 28, wherein the scanning comprises:
determining an order of the multiple projection devices in which to scan to detect the location of the non-powered medium; and
scanning the proximities of at least some of the multiple projection devices in the determined order to detect the position of the non-powered medium.

33. The computer-implemented method of claim 32, wherein the order is user configurable or is based at least in part upon past locations of the non-powered medium.

34. The computer-implemented method of claim 28, further comprising dynamically altering a focus of the digital content as the position of the non-powered medium changes.

35. The computer-implemented method of claim 28, further comprising dynamically altering a brightness of the projection of the digital content as the location of the non-powered medium changes.

36. The computer-implemented method of claim 28, wherein the non-powered medium comprises a non-powered reflective screen or a surface of a user.

37. The computer-implemented method of claim 28, further comprising:
detecting a user gesture; and
projecting different or additional digital content toward the non-powered medium at least partly in response to detecting the gesture.

38. A non-transitory computer-readable media storing computer-executable instructions that, when executed by a processor, causes the processor to perform acts comprising:
scanning proximities of multiple projection devices in a predefined order to detect a location of a medium toward which to project a portion of an electronic book;
projecting, by at least one of the multiple projection devices and from a location that is remote from the medium, the portion of the electronic book toward the located medium.

39. The computer-readable media of claim 38, wherein the electronic book comprises at least one of text, images and videos.

40. The computer-readable media of claim 38, wherein the portion of the electronic book comprises a first portion, and further storing computer-executable instructions that, when executed by the processor, causes the processor to perform acts comprising:
detecting a user gesture requesting to navigate to a second portion of the electronic book; and
projecting the second portion of the electronic book toward the medium at least partly in response to detecting the user gesture.

41. The computer-readable media of claim 38, further storing computer-executable instructions that, when executed by the processor, causes the processor to perform an act comprising:
identify a change in a position of the medium from a first location to a second location;
and wherein projecting the portion of the electronic book comprises projecting the portion of the electronic book toward the second position of the medium.

42. The computer-readable media of claim 38, wherein a first projection device projects the portion of the electronic book, and further storing computer-executable instructions that, when executed by the processor, cause the processor to perform acts comprising:
detecting that the medium has been moved from a zone covered by the first projection device to a zone covered by a second, different projection device during the projecting of the portion of the electronic book; and
initiating a handoff of the projection of the portion of the electronic book to the second projection device at least partly in response to detecting that the medium has been moved to the zone covered by the second projection device.

* * * * *